US012682042B2

(12) United States Patent
Mujawar et al.

(10) Patent No.: US 12,682,042 B2
(45) Date of Patent: Jul. 14, 2026

(54) DYNAMIC DERIVATION AND VERIFICATION OF THE MEASUREMENT OF A COMPUTING ENVIRONMENT

(71) Applicant: Arm Limited, Cambridge (GB)

(72) Inventors: Sami Ur Rehman Zia Ur Rehman Mujawar, Cambridge (GB); Suzuki Kuruppassery Poulose, Cambridge (GB)

(73) Assignee: ARM LIMITED, Cambridge (GB)

( * ) Notice: Subject to any disclaimer, the term of this patent is extended or adjusted under 35 U.S.C. 154(b) by 218 days.

(21) Appl. No.: 18/545,313

(22) Filed: Dec. 19, 2023

(65) Prior Publication Data

US 2025/0200169 A1     Jun. 19, 2025

(51) Int. Cl.
*G06F 21/53* (2013.01)
*G06F 8/65* (2018.01)
*G06F 9/455* (2018.01)
*G06F 15/16* (2006.01)
*H04L 9/00* (2022.01)
*H04L 9/40* (2022.01)
*H04L 15/16* (2006.01)
*H04L 67/12* (2022.01)

(52) U.S. Cl.
CPC .......... *G06F 21/53* (2013.01); *G06F 9/45558* (2013.01); *G06F 2009/45587* (2013.01); *G06F 2221/033* (2013.01)

(58) Field of Classification Search
CPC ................ G06F 21/53; G06F 9/45558; G06F 2009/45587; G06F 2221/033

USPC ........................................................ 726/6, 26
See application file for complete search history.

(56) References Cited

U.S. PATENT DOCUMENTS

| | | | |
|---|---|---|---|
| 10,355,853 B1 * | 7/2019 | Surmi .................... | G06F 21/575 |
| 2005/0278775 A1 * | 12/2005 | Ross ..................... | H04L 63/145 |
| | | | 726/2 |
| 2008/0109875 A1 * | 5/2008 | Kraft ................... | G06F 21/6245 |
| | | | 726/2 |

(Continued)

FOREIGN PATENT DOCUMENTS

| | | | | |
|---|---|---|---|---|
| CN | 113544673 A | * | 10/2021 | .......... G06Q 20/341 |
| WO | WO-2016048532 A1 | * | 3/2016 | .......... G06F 21/566 |
| WO | WO-2019206674 A1 | * | 10/2019 | ............ G06F 21/57 |

*Primary Examiner* — Berhanu Shitayewoldetadik
(74) *Attorney, Agent, or Firm* — Talem IP Law, LLP

(57) ABSTRACT

A method and a system for dynamically deriving and verifying a measure of a computing environment is presented. The proposed method and system are used to reliably verify measurements of the computing environment. The method includes receiving a dataset recorded by an untrusted source describing elements used to create a computing system operating in a computing environment, receiving attestation evidence generated by a trusted source including an initial measurement value describing the elements of the computing system, deriving a measurement value based on the received dataset, and performing a verification process on a measurement of the computing environment. The verification process is performed by comparing the derived measurement value with the measurement value of the attestation evidence. In response to the comparison of the derived measurement value with the measure value of the attestation evidence being equal, trustworthiness of the computing environment is determined.

18 Claims, 4 Drawing Sheets

RECEIVE A DATASET RECORDED BY AN UNTRUSTED SOURCE DESCRIBING ELEMENTS USED TO CREATE A COMPUTING SYSTEM OPERATING WITHIN A COMPUTING ENVIRONMENT 402

↓

RECEIVE ATTESTATION EVIDENCE GENERATED BY A TRUSTED SOURCE INCLUDING AN INITIAL MEASUREMENT VALUE DESCRIBING THE ELEMENTS OF THE COMPUTING SYSTEM 404

↓

DERIVE A MEASUREMENT VALUE BASED ON THE RECEIVED DATASET 406

↓

COMPARE THE DERIVED MEASUREMENT VALUE WITH THE INITIAL MEASUREMENT VALUE OF THE ATTESTATION EVIDENCE 408

↓

IN RESPONSE TO THE COMPARISON OF THE DERIVED MEASUREMENT VALUE WITH THE INITIAL MEASUREMENT VALUE OF THE ATTESTATION EVIDENCE BEING EQUAL, DETERMINE TRUSTWORTHINESS OF THE COMPUTING ENVIRONMENT 410

(56) References Cited

U.S. PATENT DOCUMENTS

| | | | | |
|---|---|---|---|---|
| 2012/0266209 A1* | 10/2012 | Gooding | ................. | H04L 63/20 |
| | | | | 726/1 |
| 2014/0053245 A1* | 2/2014 | Tosa | ........................ | H04L 63/08 |
| | | | | 726/4 |
| 2016/0098555 A1* | 4/2016 | Mersh | ..................... | G06F 21/57 |
| | | | | 713/187 |
| 2019/0347020 A1* | 11/2019 | Allo | ....................... | G06F 16/181 |
| 2021/0194860 A1* | 6/2021 | Lee | ........................ | H04L 9/3242 |
| 2022/0206842 A1* | 6/2022 | Sahita | ..................... | G06F 21/53 |
| 2023/0281299 A1* | 9/2023 | Hussmann | .............. | G06F 21/57 |
| | | | | 726/18 |
| 2024/0106642 A1* | 3/2024 | Kim | ........................ | H04L 9/088 |

* cited by examiner

400

RECEIVE A DATASET RECORDED BY AN UNTRUSTED SOURCE DESCRIBING ELEMENTS USED TO CREATE A COMPUTING SYSTEM OPERATING WITHIN A COMPUTING ENVIRONMENT 402

↓

RECEIVE ATTESTATION EVIDENCE GENERATED BY A TRUSTED SOURCE INCLUDING AN INITIAL MEASUREMENT VALUE DESCRIBING THE ELEMENTS OF THE COMPUTING SYSTEM 404

↓

DERIVE A MEASUREMENT VALUE BASED ON THE RECEIVED DATASET 406

↓

COMPARE THE DERIVED MEASUREMENT VALUE WITH THE INITIAL MEASUREMENT VALUE OF THE ATTESTATION EVIDENCE 408

↓

IN RESPONSE TO THE COMPARISON OF THE DERIVED MEASUREMENT VALUE WITH THE INITIAL MEASUREMENT VALUE OF THE ATTESTATION EVIDENCE BEING EQUAL, DETERMINE TRUSTWORTHINESS OF THE COMPUTING ENVIRONMENT 410

FIG. 4

DYNAMIC DERIVATION AND VERIFICATION OF THE MEASUREMENT OF A COMPUTING ENVIRONMENT

BACKGROUND

Attestation allows a computing component, such as a virtual machine instantiated in a virtual environment, to prove properties about itself such as what software it is running, its identity, security capabilities, etc. Remote attestation is used as part of a process to establish trust between computing components so that information passed between the two components can be expected to be authentic, intact, and trustworthy. The accuracy of the attestation mechanism is itself subject to trust in the verifying entity (a "verifier").

In secure communication between parties, a relying party, e.g., an attestation service, relies on a verifier to establish the integrity of an individual, device, or computing component in communication with the relying party. In order to provide a high level of security, the verifier software executes its code in a secure computing system so that third parties cannot interfere. The computing component in communication with the relying party presents its credentials in a message to the relying party. These credentials are termed attestation evidence. For example, the attester, e.g., the computing component in this example, presents a set of data including measurements. The verifier can verify the measurement(s) by comparing reference measurements kept in the verifier against the presented attestation evidence. This ensures the integrity and trustworthiness of the environment. However, if the reference measurements change over time, e.g., because a version of software used changes, the measurements will be difficult to verify.

BRIEF SUMMARY

A method and a system for dynamically deriving and verifying a measure of a computing environment is presented. Through processes provided herein, it is possible to reliably verify measurements of the computing environment. A computing environment includes a particular configuration of hardware and/or software. The computing environment can refer to the hardware platform and the operating system used within the platform. In some cases, the computing environment can be a virtual computing environment in which a virtual machine is instantiated or a software environment where software components execute on a platform.

A computer-implemented method includes the steps of receiving a dataset recorded by an untrusted source describing elements used to create a computing system operating in a computing environment, receiving attestation evidence generated by a trusted source including an initial measurement value describing the elements of the computing system, deriving a measurement value based on the received dataset, and performing a verification process on a measurement of the computing environment. The verification process is performed by comparing the derived measurement value with the measurement value of the attestation evidence. In response to the comparison of the derived measurement value with the measure value of the attestation evidence being equal, trustworthiness of the computing environment is determined.

A system for dynamic derivation and verification of a measurement of a computing system includes an attestation verification system. The attestation verification system can be operated as an attestation service and includes a measurement deriver coupled to receive the dataset that records a dataset, wherein the measurement deriver derives a derived measurement value from the received dataset, and a verifier coupled to receive the derived measurement value from the measurement deriver and an initial measurement value presented in attestation evidence from a secure component of the computing system. The verifier compares the derived measurement value with the initial measurement value received in the attestation evidence to generate a verification result. In some cases, the system for dynamic derivation and verification includes a dataset recorder. The dataset recorder records a dataset including elements of the computing system wherein the dataset is communicated to an attestation verification system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 illustrates a process flow of a computer-implemented method for dynamically deriving and verifying a measurement of a virtual computing system.

DETAILED DESCRIPTION

A method and a system for dynamically deriving and verifying a measurement of a computing environment is presented. Through processes provided herein, it is possible to reliably verify measurements of the computing environment.

A measurement is a token that may be generated cryptographically, e.g., a hash function, and uniquely identifies the current state of the computing environment. The properties of the computing environment and an order of operations performed to create the computing environment in which a computing system operates influences the measurement. Thus, for a given state of the computing environment, there can be different measurement values based on the order of operations performed. If a standard order of operations is not maintained across the software components managing the creation of computing environment, the measurements cannot be reliably verified. Thus, in order to reliably verify measurements of a computing environment, a system for dynamically deriving and verifying measurement of a computing environment is described.

In some cases, and for illustrative purposes within the specification, the computing system can be a virtual computing system. A virtual computing system includes a virtual environment that enables cloud-based execution of operations and/or processes described herein using computer hardware or firmware. However, in some cases, the computing system can be a computing system running software on a specific hardware platform.

Figure 1:
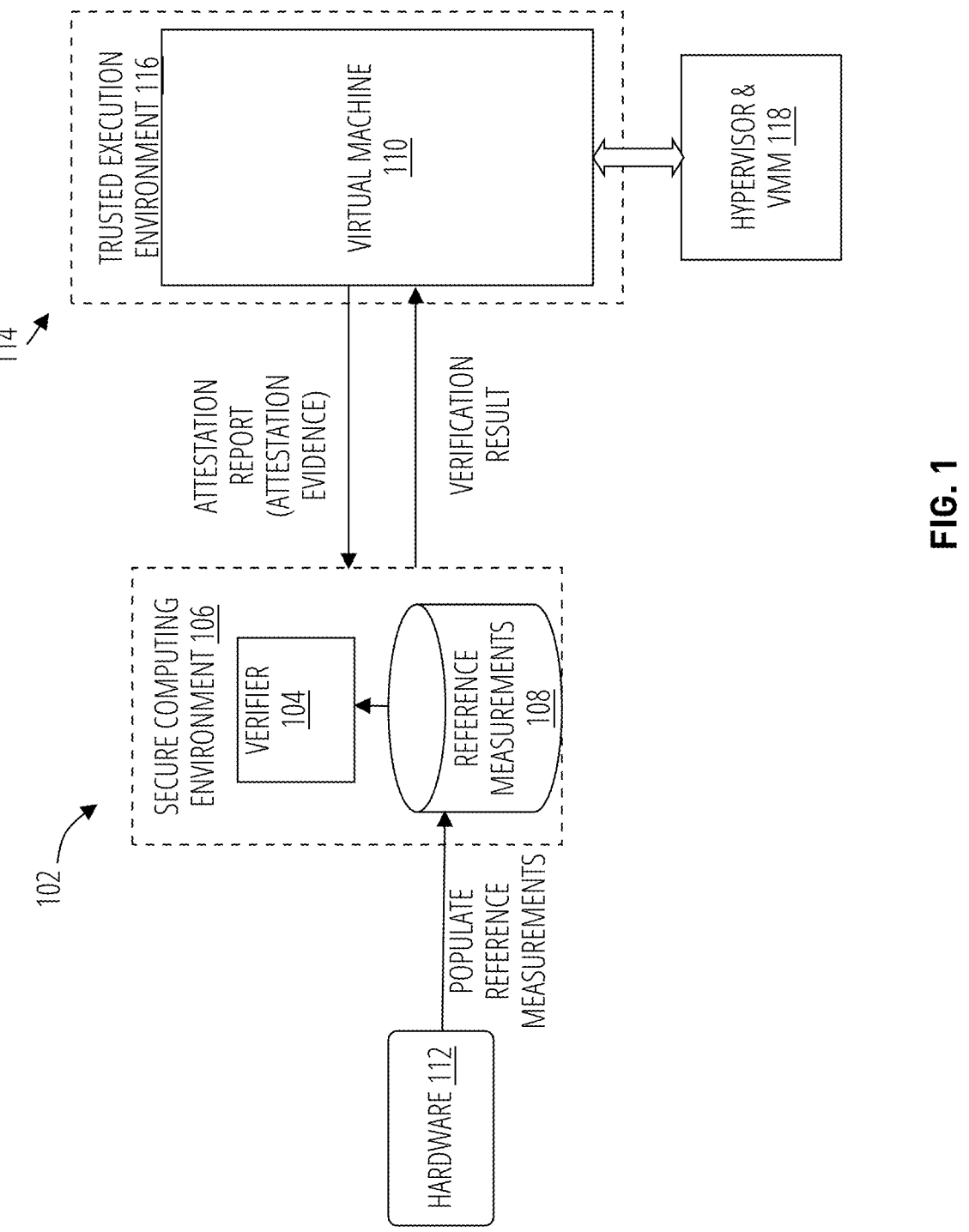
FIG. 1 illustrates a schematic diagram of an attestation verification system in communication with a virtual machine in a virtual environment.

FIG. 1 illustrates a schematic diagram of an attestation verification system in communication with a virtual machine in a virtual environment. The attestation verification system 102 includes a verifier 104 hosted within a secure computing environment 106. The secure computing environment 106 may be a data center such as a cloud data center and may include specialized hardware such as a hardware security module (HSM). The verifier 104 is provisioned with a collection of measurement values, stored as reference measurements 108, within attestation verification system 102, to compare against a presented measurement, in the form of attestation evidence presented in an attestation report, for a given instance of the virtual machine 110 in the virtual environment. Hardware 112 can be utilized to capture the reference measurements. These reference measurements 108 are then populated within the attestation verification system 102.

The virtual machine 110 can be hosted within a secure virtual environment. A virtual machine virtualizes the CPU, memory and other hardware peripherals for both the operating system kernel and the application layer. Virtual computing system 114 can include a virtual machine 110 (as shown), a container, a hybrid environment that includes a virtual machine and a container and/or the like. The virtual computing system 114 may execute one or more applications using a file system that includes binary files, software libraries, and/or other resources required to execute applications on a guest operating system (e.g., within the virtual computing system or a host operating system). A hypervisor & VMM 118, provided by the host operating system, launches the virtual computing system 114 with a set of parameters and then manages the lifecycle of the virtual computing system 114. The hypervisor & VMM 118 runs in a non-secure environment. In some cases, the non-secure environment is a cloud service provider. The virtual machine manager (VMM) can be a user mode application and is typically provided by the cloud service provider to manage the virtual machine to run on the host operating system. The hypervisor may be part of the host kernel and is privileged software. The VMM and the hypervisor are both untrusted components that work together to manage the computing environment and collect a dataset as described. Thus, while the VMM and hypervisor are separate components, for the purposes of the application, they will be shown as one component.

A claimed measurement value (CMV) may be generated by instantiating the virtual environment in a secure environment. In some cases, the secure environment can be a trusted execution environment 116. The trusted execution environment 116 can include physical circuitry elements, hardware, comprising logical elements controlled by a central processing unit as well as privileged software for management, e.g., a management monitor. As an example, an ARM CCA Realm, a trusted execution environment including both hardware and software components can be utilized.

The verifier 104 executes its code within the secure computing environment 106 and can verify the attestation evidence including the claimed measurement value (CMV) and the current state of the virtual computing system 114 for correctness. This ensures the integrity and trustworthiness of the virtual computing system. During the verification, the presented CMV is compared to one or more reference measurements 108. The result of the verification is sent back to the virtual computing system 114 as a verification result. The verification result contains trust metrics of the virtual computing system 114.

However, there are disadvantages with the verification process as described with respect to FIG. 1. For example, the verifier needs to be aware of any changes to any of the parameters used to launch the virtual computing system during its lifecycle. When there are changes to the parameters during the lifecycle of the virtual computing system, the reference measurements will need to be recaptured and repopulated in the verifier. In addition, the reference measurements can be numerous depending on possible virtual environment parameter combinations such that the comparing process can be long. The reference measurements can be bound to a specific version of software components or firmware that creates or manages the environment. An update to any of the software components or firmware may change an order of operations performed resulting in a need to update the reference measurements for reliable verification.

Figure 2:
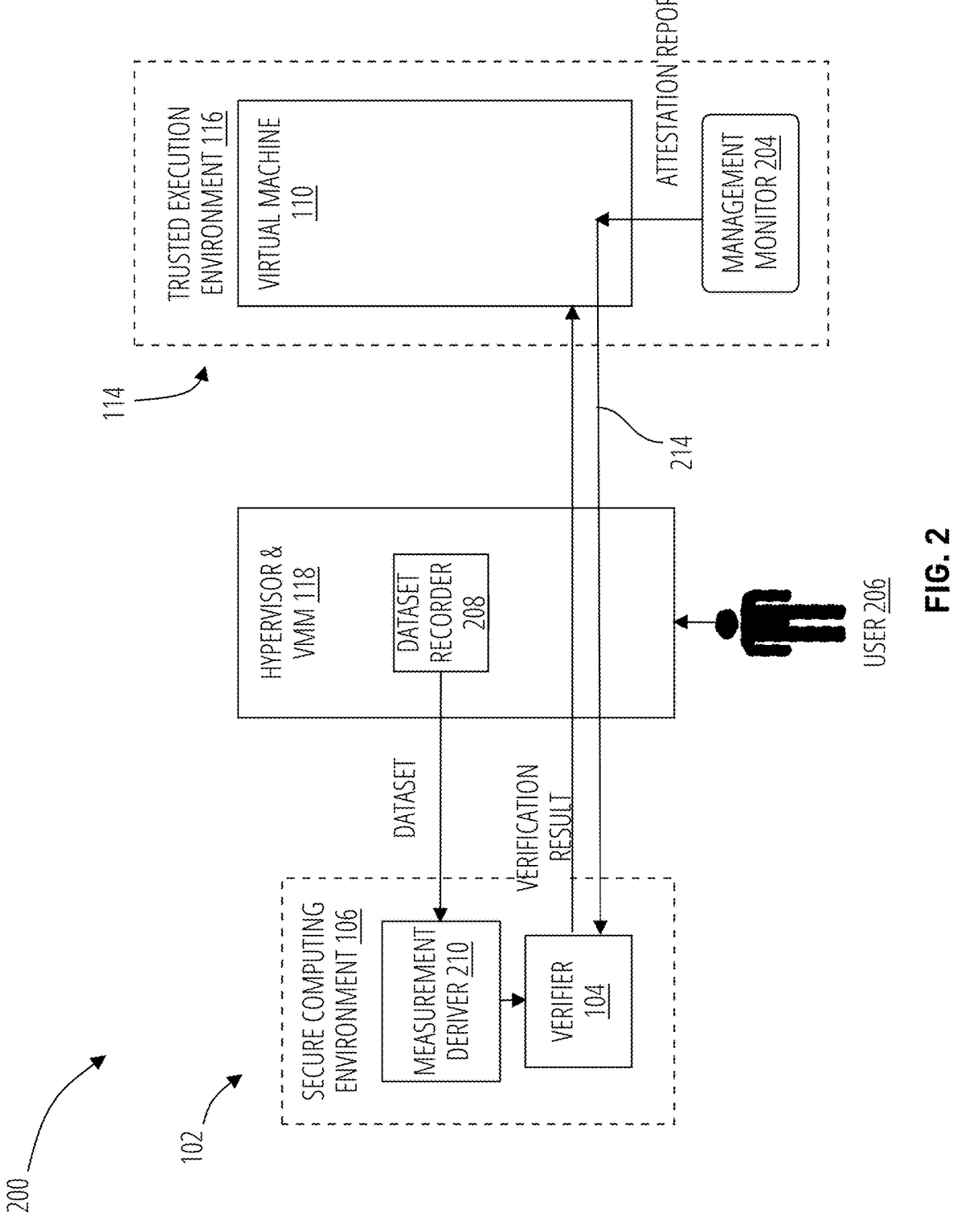
FIG. 2 illustrates an example operating environment for a system of dynamic derivation and verification of the measurement of a virtual environment.

FIG. 2 illustrates an example operating environment for a system of dynamic derivation and verification of the measurement of a computing environment. The operating environment 200 includes attestation verification system 102, virtual computing system 114, and hypervisor & VMM 118. Attestation verification system 102 is hosted within secure computing environment 106 as described with reference to FIG. 1. Likewise, virtual machine 110 is instantiated within a virtual environment and hosted in trusted execution environment 116 as described with respect to FIG. 1. Hypervisor & VMM 118 is provided by the host operating system and used to launch and manage the virtual machine 110. The hypervisor & VMM 118 operates in a non-secure environment. The trusted execution environment 116 includes a trusted entity, e.g., management monitor 204, that assists the hypervisor & VMM 118 to launch the guest virtual machine 110 as well as provides services to the virtual environment.

In order to create the virtual machine 110 in the trusted execution environment 116, user 206 requests that the hypervisor & VMM 118 launches the trusted execution environment 116 with a specific set of parameters. For example, the parameters can include one or more of number of CPUs, memory size, firmware binary, configuration data, and metadata of the virtual environment. The described list of parameters is for exemplary purposes only, e.g., other data that may impact the measurement value can also be included. With the assistance of the trusted entity, e.g., management monitor 204, the virtual machine 110 is created in the trusted execution environment 116.

The management monitor 204 runs in the trusted execution environment 116 and performs services for the trusted execution environment 116. The services performed include generating an attestation report that includes a measurement of the virtual computing system 114. This measurement can also be referred to as an initial measurement value. Initially, the initial measurement value is calculated from the parameters that were used to create the virtual machine 110. The parameters are specified by the hypervisor & VMM 118 and remain constant through the life cycle of the virtual computing system 114. The initial measurement value is then appended by the management monitor 204 by performing a hash function on the operations executed during the creation of the virtual computing system 114. The operations can include the creation of a virtual CPU resource, loading of initial data into memory, and changing the state of guest memory address range. The initial measurement value is sensitive to the order of operations which are determined by the hypervisor & VMM 118. Additionally, utilizing a different hypervisor & VMM 118 than was used previously can impact the initial measurement value. Thus, verifying the initial measurement value can be challenging for the verifier 104. In some cases, the attestation evidence can also include other information such as attributes about the platform on which the virtual environment runs.

The operating environment 200 includes a dataset recorder 208 that records data, e.g., the parameters used to create the virtual computing system 114 and commands used to create the virtual environment including the order in which the commands occur, in a dataset when the virtual machine 110 is launched. In some cases, the dataset recorder 208 can be implemented within the hypervisor & VMM 118 as shown in FIG. 2. In other cases, dataset recorder 208 can be implemented within the management monitor 204. In the case that the dataset recorder 208 is implemented within the management monitor 204, the dataset recorder 208 can use the information passed by the hypervisor & VMM 118 to the management monitor 204 which can include data to create the virtual machine 110 to populate the dataset. In addition, the management monitor 204 can collect additional metadata from the hypervisor & VMM 118 that can be collected by the dataset recorder 208. The metadata can include information about data loaded in memory of the virtual machine 110, such as a firmware image.

The recorded data/dataset can reside within the hypervisor & VMM 118.The dataset can be part of the allocated virtual machine memory or the hypervisor & VMM 118 can cache the collected data for the virtual machine 110 in which case the hypervisor & VMM 118 provides an interface for the virtual machine software, e.g., firmware and operating system, to query the data. Once the virtual machine 110 is activated in the trusted execution environment 116, the dataset is communicated by the hypervisor & VMM 118 to a measurement deriver 210 in the attestation verification system 102. In some cases, the virtual machine 110 collects the dataset and sends it to the verifier 104.

As mentioned above, the dataset recorder 208 records parameters and command data used for the creation of the virtual computing system 114. These parameters and commands can constitute dataset elements. The dataset elements can include the version of the dataset recorder 208, environment information such as information about the hypervisor & VMM 118, host kernel, etc., commands used to launch the virtual computing system, parameters used to create the virtual computing system, memory data such as memory start and range, other data such as metadata used to populate a memory region, and configuration data including the hash function used by the virtual computing system. The dataset elements are not limited to the described list of parameters and command data, the dataset elements can include any information that influences the value of the initial measurement value or needed by the verifier 104. In some cases, the dataset elements can include secondary data describing elements that are not part of the initial measurement value.

After the parameters are used to allocate resources for the virtual machine 110 in the trusted execution environment 116, the trusted execution environment 116 can be activated. Once the virtual machine 110 is activated the management monitor 204 freezes the initial measurement value and no further updates can be made to it. The hypervisor & VMM 118 can then run the virtual computing system 114 so that its code (stored in firmware) begins execution.

Management monitor 204 generates attestation evidence with the initial measurement value once the initial measurement value is frozen. The attestation evidence describes the state of the virtual computing system 114. The attestation evidence can be sent to other components via an attestation report. The attestation report can include two parts, a measurement portion and a platform portion. The measurement portion includes the initial measurement value while the platform portion includes attributes of the platform on which the virtual computing system is running. Both portions are verified by verifier 104. Once the code of the virtual computing system 114 starts to execute, the frozen initial measurement value can be encrypted and sent from management monitor 204 to the attestation verification system 102 on a secure channel 214 for verification. In addition, the recorded data comprising the dataset can be encrypted and sent to the attestation verification system 102 on secure channel 214 for verification against the initial measurement value 302. In some cases, the dataset can also be used to derive measurements for data consumed by the virtual machine 110 that is not part of the initial measurement value, e.g., the data provided to the virtual machine 110 after the initial measurement value is frozen or this may be the unmeasured data that was loaded before the initial measurement value was frozen.

Attestation verification system 102 includes a measurement deriver 210 and verifier 104. Measurement deriver 210 receives the recorded dataset and, utilizing derivation logic, derives a measurement value, e.g., as derived measurement value, described with respect to FIG. 4. The verifier 104 uses the platform portion of the attestation report to verify that the virtual computing system 114 is running on a trusted platform firmware and hardware. The verifier 104 verifies the measurement portion by comparing the derived measurement value against the initial measurement value to determine trustworthiness of the virtual computing system 114 and sends the result out as the verification result to the virtual computing system, for example.

Figure 3:
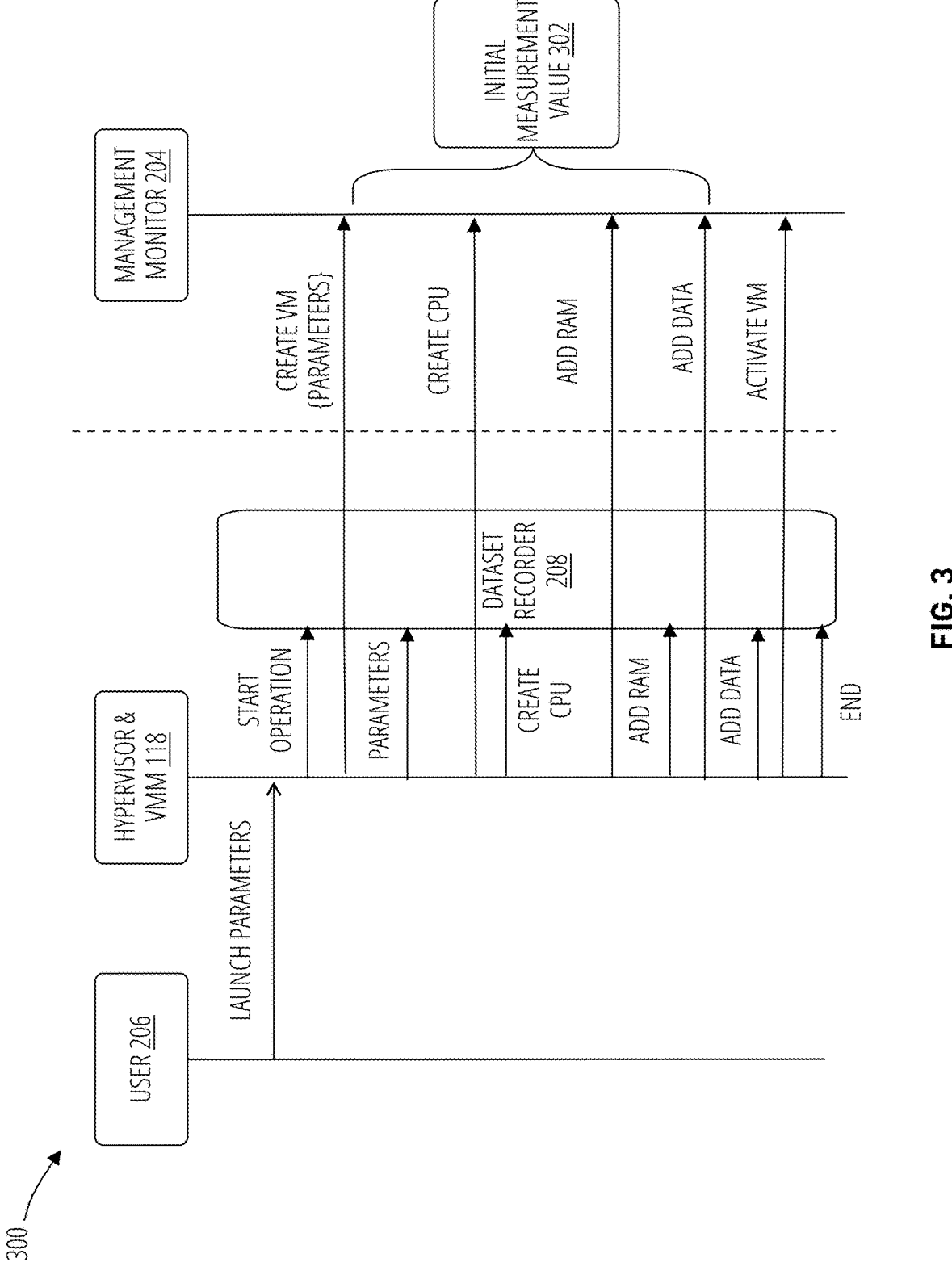
FIG. 3 illustrates a sequence diagram describing a simplified flow of events to record a dataset during creation of the virtual computing system.

FIG. 3 illustrates a sequence diagram describing a simplified flow of events to record a dataset during creation of the virtual computing system. The user 206 provides parameters to the hypervisor & VMM 118 to launch the virtual computing system 114. A series of operational commands are initiated by the hypervisor & VMM 118 to launch the virtual computing system 114. Dataset recorder 208 collates the dataset during the creation of the virtual computing system 114 by recording the parameters, e.g., configuration data for the virtual machine, and operational command data. During the creation of the virtual computing system 114, the same parameters and operational command data are extended to the management monitor 204 to compute the initial measurement value 302.

As an example, referring to FIG. 3, the user 206 can indicate to the hypervisor & VMM 118 to launch a virtual computing system 114 with a CPU (central processing unit) and one GB (gigabyte) of RAM (random access memory). Hypervisor & VMM 118 then launches the virtual computing system 114 with parameters. These parameters are then captured in the dataset recorder 208. The same parameter values and commands are passed to the management monitor 204 in the trusted execution environment 116 where they are used for computation of the initial measurement value 302.

The hypervisor & VMM 118 sends an operational command, create CPU to the management monitor 204. The dataset recorder 208 records the command data and extends the command data to the management monitor 204 as shown in FIG. 3. In some cases, the hypervisor & VMM sends the same command data directly to the management monitor 204 and to the dataset recorder 208 such that the command data does not pass through the dataset recorder 208 to the management monitor 204. The hypervisor & VMM 118 then sends the create RAM command to create RAM at an address for a range covering a gigabyte. The dataset recorder 208 records the command data and extends the command to the management monitor 204 which again utilizes the command data, computes a hash of the command data, and appends the initial measurement value 302 with the hash value. Then the hypervisor & VMM 118 sends an operational command, create Data. The dataset recorder 208 records the command data and extends it to the management monitor 204 that computes a hash of the command and appends the initial measurement value 302 with the hash value. The data range can be stored as well as attributes of the data and metadata that can identify the data that was loaded for the virtual computing system 114. Finally, hypervisor & VMM 118 sends an activate virtual machine command. At this point the initial measurement value 302 is frozen and does not change during the lifetime of the virtual machine 110. If, for example, any of these operations, e.g., commands, are performed in a different order, the initial measurement value 302 would be different.

FIG. 4 illustrates a process flow of a method for dynamically deriving and verifying a measure of a computing environment. Referring to FIG. 4, method 400 may begin by receiving (402) a dataset recorded by an untrusted source describing dataset elements used to create a computing system operating within a computing environment. The method can be performed by attestation verification system 102 as shown in FIG. 1 and FIG. 2. Method 400 further receives attestation evidence generated by a trusted source including an initial measurement value describing the elements of the computing system. In some cases, both the dataset and the attestation evidence are encrypted. Upon receiving (402, 404) the encrypted dataset and the attestation evidence the attestation verification system 102 begins by decrypting the dataset and the attestation evidence.

Method 400 derives (406) a measurement value based on the dataset. The recorded dataset and the initial measurement value in the attestation report can be used to verify that the computing system operating within a computing environment is securely initialized according to a policy. The policy can be a predefined metric. In some cases, the policy is applied to the received dataset and initial measurement value to determine that each of the elements lie within a predetermined range of values. The policy may include, but is not limited to, values and definitions of the parameters for creating the virtual computing system, a firmware image loaded into the virtual computing system, software version of the host kernel, and version of the hypervisor & VMM 118. The dataset is processed by derivation logic within the attestation verification system 102 to compute a derived measurement value. The derivation logic iterates through entries in the dataset to compute the derived measurement value. The derived measurement value may be computed using a subset of the entries in the dataset using a measurement algorithm that matches an algorithm in the management monitor 204. The measurement algorithm may involve computing a hash value using the dataset. The derived measurement value is indicative of what the attestation verification system 102 expects the initial measurement value to be based on the entries recorded in the dataset. In some cases, the derivation logic may request additional information from an external source, such as a transparency server/software supply chain service, about one of the entries to be used in the derivation. For example, the transparency server can provide a hash of the firmware loaded in the virtual computing system 114. In some cases, the measurement deriver can store the derived measurement value for a given dataset and use the derived measurement value for any subsequent requests that match the policy and similar dataset to speed up the verification process.

Method 400 further performs a verification process on a measurement of the computing environment. The verification includes comparing (408) the derived measurement value with the initial measurement value of the attestation evidence. In response to the comparison of the derived measurement value with the initial measurement value of the attestation evidence satisfying a matching criterion, such as being equal, method 400 determines (410) trustworthiness of the computing environment. Upon completion of performing the verification process on the measurement of the computing environment, a verification result can be sent indicating a result, e.g., a success or failure of the policy determination and the comparison. The verification result can be sent to the virtual computing system 114 for verification that it was initialized properly with the parameters that it expects.

Although the subject matter has been described in language specific to structural features and/or acts, it is to be understood that the subject matter defined in the appended claims is not necessarily limited to the specific features or acts described above. Rather, the specific features and acts described above are disclosed as examples, implementing the claims and other equivalent features and acts; they are intended to be within the scope of the claims.

What is claimed is:

1. A computer implemented method for verifying trustworthiness of a virtual environment configured to execute applications on a guest operating system, the method comprising:

receiving, at a secure computing environment implemented by one or more processors, a dataset recorded by an untrusted source, the dataset comprising parameters and commands used to create a virtual environment configured to execute applications on a guest operating system;

receiving attestation evidence generated by a trusted source operating within a trusted execution environment that is distinct from the secure computing environment, the attestation evidence describing a post-creation state of the virtual environment and comprising an initial measurement value, wherein the initial measurement value is a cryptographic hash computed by the trusted source using at least some of the parameters and commands used during creation of the virtual environment;

deriving at the secure computing environment, a derived measurement value, wherein the derived measurement value is a cryptographic hash computed by the secure computing environment using at least some of the parameters and commands included in the received dataset; and performing a verification process by:

comparing the derived measurement value with the initial measurement value included in the attestation evidence; and in response to determining that the derived measurement value satisfies a matching criterion with respect to the initial measurement value, generating a verification result indicating trustworthiness of the virtual environment.

2. The method of claim 1, further comprising, upon completion of performing the verification process on the attestation evidence, sending a verification result that includes a result of the comparison of the derived measurement value with the initial measurement value to the virtual environment.

3. The method of claim 1, wherein performing the verification process further comprises applying a policy to the received dataset and the initial measurement value to determine that each of a plurality of elements of the received dataset lies within a predetermined range of values.

4. The method of claim 1, wherein the dataset includes entries recorded in order of occurrence during creation of the computing system, and wherein deriving the derived measurement value includes iterating through the entries recorded in order of occurrence and computing the derived measurement value based on the entries.

5. The method of claim 1, wherein elements of the dataset include one or more of a version of a dataset recorder, environment information, configuration data, parameters, commands, memory range, and data range.

6. The method of claim 1, wherein the untrusted source is a hypervisor and virtual machine manager (VMM).

7. The method of claim 1, wherein the trusted source is a management monitor that operates in a trusted execution environment.

8. The method of claim 1, wherein deriving the derived measurement value further utilizes information stored in an external source.

9. The method of claim 1, wherein the virtual environment comprises a virtual machine instantiated during the creation of the virtual environment, and wherein the attestation evidence describes a state of the virtual machine after creation.

10. The method of claim 1, wherein the attestation evidence generated by the trusted source further includes a further measurement value corresponding to secondary data, and wherein the secondary data describes elements not represented in the initial measurement value.

11. The method of claim 10, further comprising:
receiving a further measurement value of secondary data in the attestation evidence;
deriving a derived second measurement value from the secondary data received in the attestation evidence; and
performing a further verification process by:
comparing the derived second measurement value with the further measurement value, and
in response to determining that the derived second measurement value satisfies a matching criterion with respect to the further measurement value, determining trustworthiness of the virtual environment configured to execute applications on a guest operating system.

12. A system for dynamic derivation and verification of trustworthiness of a virtual environment configured to execute applications on a guest operating system, comprising:
an attestation verification system, comprising:
a measurement deriver coupled to receive a dataset recorded by an untrusted source, the measurement deriver being configured to derive a derived measurement value from the received dataset, wherein the derived measurement value is a cryptographic hash computed using at least some parameters and commands included in the received dataset; and
a verifier coupled to receive the derived measurement value and an initial measurement value included in attestation evidence generated by a trusted source, the trusted source operating within a trusted execution environment that is distinct from the attestation verification system, the attestation evidence describing a state of the virtual environment after creation, wherein the initial measurement value is a cryptographic hash computed by the trusted source using at least some of the parameters and commands used during creation of the virtual environment,
wherein the verifier compares the derived measurement value with the initial measurement value received in the attestation evidence to generate a verification result indicating trustworthiness of the virtual environment after creation when the derived measurement value satisfies a matching criterion with respect to the initial measurement value, wherein the virtual environment is configured to execute applications on a guest operating system.

13. The system of claim 12, further comprising a dataset recorder operating as the untrusted source and configured to record the dataset, wherein the dataset includes elements used to create the virtual environment.

14. The system of claim 13, wherein elements of the dataset include one or more of a version of a dataset recorder, environment information, configuration data, parameters, commands, memory range, and data range.

15. The system of claim 14, wherein the elements of the dataset are recorded in order during creation of the virtual environment.

16. The system of claim 13, wherein the dataset recorder operates in an untrusted environment.

17. The system of claim 13, wherein the dataset recorder comprises a hypervisor or virtual machine manager (VMM) operating in an untrusted environment.

18. The system of claim 12, wherein the virtual environment comprises a virtual machine instantiated during creation of the virtual environment configured to execute applications on a guest operating system.

* * * * *